US012724674B2

(12) United States Patent
Dasari et al.

(10) Patent No.: US 12,724,674 B2
(45) Date of Patent: Sep. 1, 2026

(54) METHOD FOR PROVIDING A SECONDARY BACKUP APPLICATION AS A BACKUP FOR A PRIMARY APPLICATION

(71) Applicants: Robert Bosch GmbH, Stuttgart (DE); Carnegie Mellon University, Pittsburgh, PA (US)

(72) Inventors: Dakshina Narahari Dasari, Renningen (DE); Anthony Rowe, Pittsburgh, PA (US); Arne Hamann, Ludwigsburg (DE)

(73) Assignees: ROBERT BOSCH GMBH, Stuttgart (DE); CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 18/510,937

(22) Filed: Nov. 16, 2023

(65) Prior Publication Data

US 2024/0281339 A1 Aug. 22, 2024

(30) Foreign Application Priority Data

Feb. 17, 2023 (DE) .................... 10 2023 201 396.7

(51) Int. Cl.
*G06F 11/1446* (2026.01)

(52) U.S. Cl.
CPC .... *G06F 11/1458* (2013.01); *G06F 2201/805* (2013.01)

(58) Field of Classification Search
None
See application file for complete search history.

(56) References Cited

U.S. PATENT DOCUMENTS

| | | | | |
|---|---|---|---|---|
| 10,860,433 | B1 * | 12/2020 | Lieberman | G06F 16/907 |
| 10,949,308 | B2 * | 3/2021 | Iyer | G06F 3/065 |
| 11,550,628 | B2 * | 1/2023 | Eschinger | G06F 9/45558 |
| 12,169,635 | B2 * | 12/2024 | Rudrabhatla | G06F 3/0673 |
| 12,229,086 | B2 * | 2/2025 | Bhanjois | G06F 11/1456 |
| 12,405,861 | B2 * | 9/2025 | Mandal | G06F 11/1461 |
| 2012/0054409 | A1 * | 3/2012 | Block | G06F 11/203 718/1 |
| 2019/0196913 | A1 * | 6/2019 | Uragaki | G06F 11/1461 |

(Continued)

OTHER PUBLICATIONS

QoS Policies and Architecture for Cache/Memory in CMP Platforms (Year: 2007).*

(Continued)

*Primary Examiner* — Kim T Nguyen
(74) *Attorney, Agent, or Firm* — NORTON ROSE FULBRIGHT US LLP

(57) ABSTRACT

A method for providing a secondary backup application as a backup for a primary application, particularly for a predictive standby in distributed systems. The method includes the following steps are carried out by a predictive standby manager: receiving application-specific state data, the application-specific state data being obtained from monitoring a state of the primary application; receiving platform-specific state data, the platform-specific state data being obtained from monitoring a state of at least one platform that executes the primary application; initiating a backup process for using the secondary backup application based on the received application-specific state data and the platform-specific state data.

10 Claims, 2 Drawing Sheets

(56) References Cited

U.S. PATENT DOCUMENTS

| | | | | |
|---|---|---|---|---|
| 2020/0313960 | A1 * | 10/2020 | Rosa-Bian | G06F 11/2007 |
| 2021/0114854 | A1 * | 4/2021 | Roethling | B66F 17/006 |
| 2021/0191769 | A1 * | 6/2021 | Eschinger | G06F 9/5077 |
| 2022/0060391 | A1 * | 2/2022 | Browne | H04L 41/0866 |
| 2024/0256491 | A1 * | 8/2024 | Bhanjois | G06F 16/137 |
| 2024/0281339 | A1 * | 8/2024 | Dasari | G06F 11/1458 |
| 2024/0289232 | A1 * | 8/2024 | Mandal | G06F 11/1461 |
| 2024/0303163 | A1 * | 9/2024 | De Haro | G06F 11/1451 |
| 2024/0377971 | A1 * | 11/2024 | Rudrabhatla | G06F 3/065 |
| 2025/0007988 | A1 * | 1/2025 | Letort | H04L 67/10 |

OTHER PUBLICATIONS

A Cloud Environment for Backup and Data Storage (Year: 2014).*

Live migration using checkpoint and restore in userspace (CRIU): Usage analysis of network, memory and CPU (Year: 2021).*

* cited by examiner 1
30
sensors
35
output-interfaces
40
actuators
201
primary application
231
data
202
secondary backup application
247
241
242
50
predictive standby manager
244
245
246
243
mapping
platform(s)
210
communication infrastructure
220
different platforms
210
...

METHOD FOR PROVIDING A SECONDARY BACKUP APPLICATION AS A BACKUP FOR A PRIMARY APPLICATION

CROSS REFERENCE

The present application claims the benefit under 35 U.S.C. § 119 of German Patent Application No. DE 10 2023 201 396.7 filed on Feb. 17, 2023, which is expressly incorporated herein by reference in its entirety.

FIELD

The present invention relates to a method for providing a secondary backup application as a backup for a primary application. Furthermore, the present invention relates to a computer program as well as a data processing apparatus.

BACKGROUND INFORMATION

The general goal of redundancy methods is to increase an application's reliability and resilience to errors. There are several approaches described in the literature and available in practical systems.

To reduce the downtime of a system after an outage, it is common to replicate the whole system to another standby site or to another provider. This is an established but very expensive approach that comes in different types: hot, cold and warm standby.

SUMMARY

According to aspects of the present invention, a method, a computer program, as well as an apparatus are provided. Features and details of the present invention are disclosed herein. Features and details described in the context to the method according to the present invention also correspond to the computer program as well as the apparatus according to the present invention, and vice versa in each case.

An aspect of the present invention includes a method for providing a secondary backup application as a backup for a primary application, particularly for a predictive standby in a distributed system. According to an example embodiment of the present invention, the following steps are carried out preferably by a predictive standby manager, particularly preferably one after the other and/or repeatedly:

- Receiving application-specific state data, the application-specific state data being obtained from monitoring a state of the primary application,
- Receiving platform-specific state data, the platform-specific state data being obtained from monitoring a state of at least one or multiple platform (s) that execute (s) the primary application,
- Initiating a backup process, particularly for using the secondary backup application as the backup for the primary application, based on the received application-specific state data and the received platform-specific state data.

Unlike conventional solutions that run and update the secondary backup application either continuously, periodically, or only when the primary application fails, the method according to the present invention may be more flexible and resource efficient. This is particularly because the method leverages both application-specific knowledge (the application-specific state data) and dynamic metrics of the execution platform (the platform-specific state data), e.g., communication and/or compute resources. Utilizing this knowledge, the predictive standby manager may ensure that the secondary backup application runs only when needed. This may also cover the special cases of cold and/or warm and/or hot standby capabilities, thereby resulting in more flexible and cost-effective resilient system solutions.

According to an example embodiment of the present invention, additional aspects of the present invention may comprise that the method steps are carried out by a predictive standby manager. The predictive standby manager may be configured as a soft- and/or hardware component, particularly of an embedded system. Its functionality may comprise deciding on deploying, activating, suspending, and tearing down the secondary backup application as well as triggering updates of data from the corresponding primary application to keep the secondary backup application in sync.

The predictive standby manager may also be able to provide a cold standby. A cold standby may refer to a redundancy method that involves having an identical secondary backup application as a backup for a primary application. The cold standby system may usually be started and called upon only on failure of the primary application.

The predictive standby manager may be able to provide a hot standby. A hot standby may refer to a redundancy method in which an identical secondary backup application is executed simultaneously with the primary application. Upon failure of the primary application, the hot standby secondary backup application may immediately take over, replacing the primary application. Compared to cold standby, system data and state may often constantly be mirrored in real-time so that the primary and the secondary backup applications are in sync and operate on identical data and state. This reduces the time until the secondary backup application can take over operation but also comes with increased cost for provisioning the necessary resources (e.g. execution time, data bandwidth, and storage).

The predictive standby manager may be able to provide a warm standby. A warm standby may refer to a redundancy method, situated between cold and hot standby. A secondary application on warm standby is turned on periodically to receive updates from the primary application. This reduces the time for the secondary application to take over operation on failure of the primary application compared to the cold standby method. Compared to the hot standby method, the warm standby methods is usually slower in responding to system failures, but also less expensive since the secondary backup application is executed only sporadically.

According to an example embodiment of the present invention, it is also possible that the platform-specific state data results from a monitoring of dynamic properties of a digital communication and/or computation infrastructure of the at least one platform, particularly to consider the influence of the dynamic properties on the functioning of the primary application for the initiation of the backup process. This allows to take into account that the proper functioning of the application might also rely on the dynamic properties of the digital communication and/or computation infrastructure, e.g., timely execution and/or timely delivery of required data for real-time critical systems. Conventional solutions usually focus only on the correct or undisturbed execution of the primary application (e.g., detection of crashes, runtime errors, bit flips, etc.) and do not take into account that the proper functioning of the application might also rely on dynamic properties of the digital communication and computation infrastructure, e.g., timely execution and/or timely delivery of required data for real-time critical systems.

Furthermore, according to an example embodiment of the present invention, it is possible that the backup process may comprise at least one of the following:

running the secondary backup application,
deciding on deploying the secondary backup application,
activating the secondary backup application,
suspending the secondary backup application,
tearing down the secondary backup application,
triggering updates of data from the primary application to keep the secondary backup application.

It can be necessary that the secondary backup application must be "updated" with data from the primary application to be kept and therefore to be able to replace the primary application adequately. The backup process may therefore comprise a regular and repeated triggering of updates of data from the corresponding primary application to keep the secondary backup application. The monitoring of the state of the primary application may provide application-specific knowledge that can be used to decide on the initiation of the backup process. Also, the monitoring of the state of the platform may comprise monitoring communication and/or compute resources to decide on the initiation of the backup process.

According to another advantageous example embodiment of the present invention, the backup process comprises deploying the secondary backup application on the same at least one platform, particularly hardware platform, that executes the primary application. In other words, the secondary backup application may be deployed by the predictive standby manager on the same digital hardware (short: HW) platform as the primary application.

According to another aspect of the present invention, the backup process comprises deploying the secondary backup application on at least one different platform, particularly hardware platform, than the at least one platform that executes the primary application. The platforms may be part of the distributed system. Also, a communication infrastructure of the different platforms may be automatically reconfigured so that the secondary backup application takes over an operation of the primary application and/or receives data required for this and/or uses connections to sensors and/or actuators and/or input- and/or output-interfaces previously used for and/or by the primary application. The communication infrastructure may automatically be reconfigured by the predictive standby manager according to the backup process so that the secondary backup application receives the necessary data for calculations as soon as it takes over operation of the failed primary application. The backup process may also include establishing connections to local I/O such as sensors and actuators.

Furthermore, according to an example embodiment of the present invention, the step of initiating the backup process may comprise the following steps:

Detecting a critical state, particularly a failure and/or a redundancy requiring safety- and/or time-critical mode, of the primary application based on an evaluation of the received application-specific state data,
Activating the secondary backup application if the critical state is detected.

However, once the primary application returns to a non-critical state, this may detected and the secondary backup application may be deactivated and/or suspended and/or torn down.

According to an example embodiment of the present invention, it is possible that the step of initiating the backup process further comprises the following steps:

Predicting a critical state, particularly a failure and/or a transient software failure and/or a runtime error and/or a time until a potential crash, of the primary application, particularly based on an application of machine learning using the received application-specific state data and/or based on monitoring compute operations and/or memory transactions,
Activating the secondary backup application based on the prediction.

According to an example embodiment of the present invention, it is also possible that the step of initiating the backup process further comprises the following steps:

Predicting a critical state, particularly a hardware failure, of the platform, preferably based on an evaluation of the received platform-specific state data,
Activating the secondary backup application based on the prediction.

In another aspect of the present invention, a computer program may be provided, in particular a computer program product, comprising instructions which, when the computer program is executed by a computer, cause the computer to carry out the method according to the present invention. Thus, the computer program according to the present invention can have the same advantages as have been described in detail with reference to a method according to the present invention.

In another aspect of the present invention, an apparatus for data processing may be provided, which is configured to execute the method according to the present invention. As the apparatus, for example, a computer can be provided which executes the computer program according to the present invention. The computer may include at least one processor that can be used to execute the computer program. Also, a non-volatile data memory may be provided in which the computer program may be stored and from which the computer program may be read by the processor for being carried out.

According to another aspect of the present invention, a computer-readable storage medium may be provided which comprises the computer program according to the present invention. The storage medium may be formed as a data storage device such as a hard disk and/or a non-volatile memory and/or a memory card and/or a solid-state drive. The storage medium may, for example, be integrated into the computer.

Furthermore, according to an example embodiment, the method according to the present invention may be implemented as a computer-implemented method.

Further advantages, features and details of the present invention will be apparent from the following description, in which embodiments of the present invention are described in detail with reference to the figures. In this context, the features mentioned herein may each be essential to the present invention individually or in any combination.

DETAILED DESCRIPTION OF EXAMPLE EMBODIMENTS

In the following figures, the identical reference signs are used for the same technical features even of different embodiment examples.

According to the state of the art, conventional standby methods may often not be suitable. The hot standby method may for many applications be prohibitively expensive, especially in the embedded domain. The more cost effective cold standby method may be often too slow for many applications, especially in safety and real-time critical systems. Also, the warm standby method may often be not suitable, especially for safety and real-time critical systems, since updates are required periodically to ensure that data and state that the secondary backup application operates upon are sufficiently fresh and up-to-date. The method according to embodiments of the present invention may solve these issues by exploiting, particularly dynamic, metrics of the execution platform, particularly communication and computation resources, as well as application specific knowledge.

Figure 1:
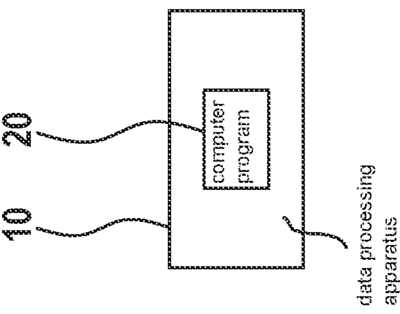
FIG. 1 shows a method, apparatus, and computer program according to example embodiments of the present invention.
Figure 1:
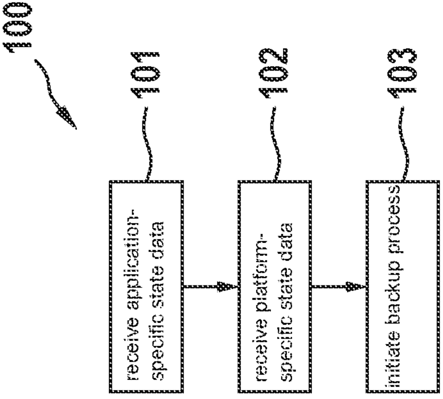
Figure 2:
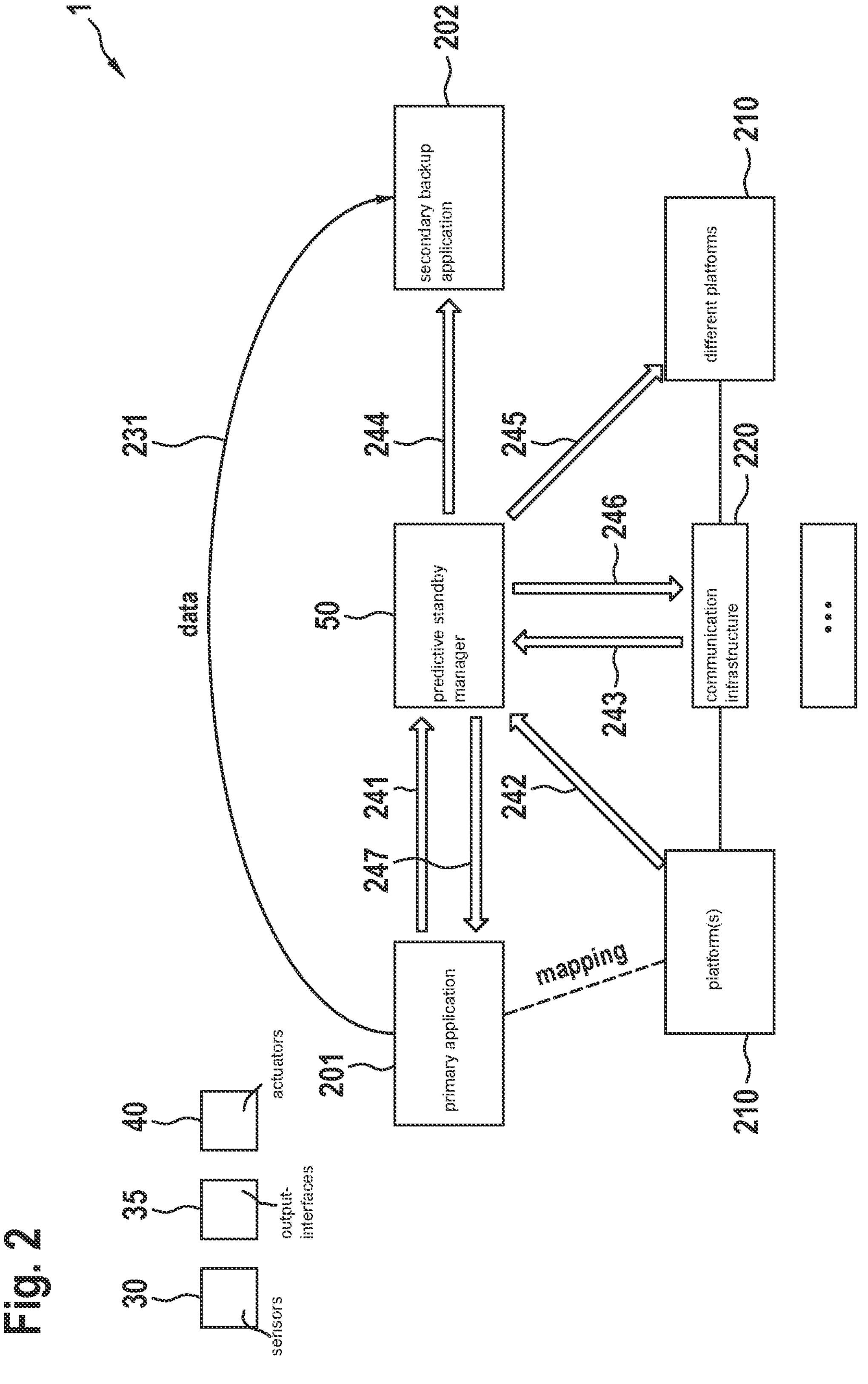
FIG. 2 shows further details of a method according to example embodiments of the present invention.

FIG. 1 shows a method 100 according to embodiments of the present invention for providing a secondary backup application 202 as a backup for a primary application 201, particularly for a predictive standby in a distributed system 1. A predictive standby manager 50 may be provided, as shown in FIG. 2, that carries out the method steps of the method 100. According to a first method step 101, application-specific state data may be received. The application-specific state data may be obtained from monitoring a state of the primary application 201. Then, according to a second method step 102, platform-specific state data may be received. The platform-specific state data may be obtained from monitoring a state of at least one platform 210 that executes the primary application 201.

Finally, according to a third method step 103, a backup process may be initiated for using the secondary backup application 202 as the backup for the primary application 201 based on the received application-specific state data and the platform-specific state data.

The backup process may comprise triggering updates of data 231 from the primary application 201 to keep the secondary backup application 202, as shown in FIG. 2. The backup process may also comprise deploying the secondary backup application 202 on at least one different platform 210, particularly hardware platform 210, than the at least one platform 210 that executes the primary application 201. The backup process or another process may be used to automatically reconfigure a communication infrastructure 220 of the different platforms 210, so that the secondary backup application 202 takes over an operation of the primary application 201 and/or receives data 231 required for this and/or uses connections to sensors 30 and/or actuators 40 and/or input- and/or output-interfaces 35 previously used for the primary application 201.

The platform-specific state data may result from a monitoring of dynamic properties of a digital communication and/or computation infrastructure 220, as shown in FIG. 2. This allows to consider the influence of the dynamic properties on the functioning of the primary application 201 for the initiation 103 of the backup process.

FIG. 1 also shows a computer program 20 and a data processing apparatus 10 according to embodiments of the present invention.

FIG. 2 shows the general operation and interaction of the predictive standby manager 50 according to embodiments of the present invention. The predictive standby manager 50 may continuously receive, particularly with a configurable policy, the mode and state 241 of the primary application 201, as well as dynamic metrics 242 of the digital HW platform 210 running the primary application 201 and the dynamic metrics 243 of the communication infrastructure 220 responsible for transmitting the data that the primary application 201 needs for its computations. Based on this information, the predictive standby manager 50 may decide whether and when to perform at least one action 244, 245 of the backup process like to deploy and/or activate and/or suspend and/or tear down the secondary backup application 202. If the secondary backup application 202 is already deployed, the predictive standby manager 50 can also trigger a data refresh 247, particularly using a configurable policy, e.g. periodic, to keep the secondary backup application 202 in sync with the primary application 201. Furthermore, a reconfiguration 246 of the communication infrastructure 220 may be provided during the backup process.

In the following, examples on how to exploit application specific knowledge are described. If the primary application 201 performs safety- or time-critical operations only in certain situations, redundancy is not constantly required to increase/ensure system resilience. However, when the primary application 201 enters a safety- or time-critical mode requiring redundancy, the predictive standby manager 50 may deploy the secondary backup application 202, trigger a continuous data refresh with an appropriate policy (e.g., periodically) and start its execution. Once the primary application 201 returns to a non-critical mode, the secondary backup application 202 may be suspended or torn down.

According to another example, by observing the system state of the primary application 201, e.g., by monitoring compute operations or memory transactions, the predictive standby manager 50 may use Machine Learning methods to predict transient software failures, runtime errors, or even the time until the potential crash of the primary application 201. Based on this information, the predictive standby manager 50 may deploy the secondary backup application 202, trigger a continuous data 231 refresh with an appropriate policy, e.g., periodically, and start its execution. In case the employed method for prediction negates the warning concerning a potential failure of the primary application 201, the secondary backup application 202 may be suspended or torn down, and the primary application 201 may resume operation.

According to another example, if the primary application 201 is activated only in special situations and requires redundancy to increase/ensure system resilience, the predictive standby manager 50 may automatically synchronize the deployment, activation, and tear down of the secondary backup application 202 with the lifecycle of the primary application 201.

In the following, examples on how to exploit dynamic metrics of the compute and communication infrastructure 220 are described. By monitoring the health of the hardware platform 210, e.g., by using temperature sensors 30, on which the primary application 201 is running, the predictive standby manager 50 may detect when the hardware platform 210 health is approaching a critical state. Based on this information, the predictive standby manager 50 may deploy the secondary backup application 202, trigger 247 a continuous data refresh with an appropriate policy (e.g., periodically) and starts its execution.

The predictive standby manager 50 may monitor the resource situation on the HW platforms 210 in the system as well as on the wired or wireless communication infrastructure 220. Metrics that can be monitored may include: load and utilization of CPUs and/or load and utilization of the memory infrastructure 220 on a HW platform 210 and/or utilized and remaining bandwidth of wired or wireless communication channels, etc. Based on this information, the predictive standby manager 50 may predict resource shortage in the system that might lead to (intermittent) failure of the primary application 201. As a reaction, the predictive standby manager 50 may deploy the secondary backup application 202 in a different place of the distributed system 1, e.g., on a different HW platform 210, trigger a continuous data refresh with an appropriate policy, e.g., periodically, and start its execution. The predictive standby manager 50 may reconfigure the communication infrastructure 220 as soon as the secondary backup takes over the operation of the primary application 201 to ensure that it receives the necessary data 231 for its computations.

The predictive standby manager 50 may also monitor QoS (i.e., Quality of Service) metrics that are critical to the proper functioning of an application present in the system 1. It may be provided that the QoS requirements of an application are communicated to the predictive standby manager 50 upon entry into the system 1 so that appropriate decisions can be made. QoS requirements that are critical to the proper functioning of an application and that can be monitored by the predictive standby manager 50 may include: the application's response time (e.g., from receiving an input to providing an output), the age of the received data 231 that the application is working on, the jitter of the received and sent messages, and the like. Based on this information, the predictive standby manager 50 may predict and anticipate declining QoS characteristics that threaten the proper functioning of the primary application 201 and, in response, deploy the secondary backup application 202 elsewhere in the distributed system 1 (e.g., on a different HW platform 210), trigger a continuous data 231 refresh with an appropriate policy (e.g., periodically), and start its execution. When the monitored QOS metrics return to an acceptable range, the secondary backup application 202 may be suspended or torn down, and the primary application 201 may resume its operation. This capability of embodiments of the present invention is particularly interesting and important for achieving resilience for real-time critical and other QoS sensitive applications.

The above explanation of the embodiments describes the present invention in the context of examples. Of course, individual features of the embodiments can be freely combined with each other, provided that this is technically reasonable, without leaving the scope of the present invention.

What is claimed is:

1. A method for providing a secondary backup application as a backup for a primary application, for a predictive standby in a distributed system, the method comprising the following steps carried out by a predictive standby manager:
- receiving application-specific state data, the application-specific state data being obtained from monitoring a state of the primary application;
- receiving platform-specific state data, the platform-specific state data being obtained from monitoring a state of at least one platform that executes the primary application; and
- initiating a backup process for using the secondary backup application as the backup for the primary application based on the received application-specific state data and the received platform-specific state data, wherein the predictive standby manager processes both the received application-specific state data and the received platform-specific state data in order to initiate the backup process, and wherein the platform-specific state data includes at least one metric comprising a temperature of the at least one platform, a load of a CPU of the at least one platform, or a utilization of the CPU.

2. The method of claim 1, wherein the platform-specific state data results from a monitoring of dynamic properties of a digital communication and/or computation infrastructure of the at least one platform to consider an influence of the dynamic properties on a functioning of the primary application for the initiation of the backup process.

3. The method of claim 1, wherein the backup process includes at least one of the following:
- running the secondary backup application,
- deciding on deploying the secondary backup application,
- activating the secondary backup application,
- suspending the secondary backup application,
- triggering updates of data from the primary application to keep the secondary backup application.

4. The method of claim 1, wherein the backup process includes deploying the secondary backup application on the same hardware platform that executes the primary application.

5. The method of claim 1, wherein the backup process includes deploying the secondary backup application on at least one different platform than the at least one platform that executes the primary application, the at least one different platform and the at least one platform being part of the distributed system, and a communication infrastructure of the at least one different platform being automatically reconfigured so that the secondary backup application: (i) takes over an operation of the primary application, and/or (ii) receives data required for taking over the operation of the primary application, and/or (iii) uses connections to sensors and/or actuators and/or input and/or output-interfaces previously used for the primary application.

6. The method of claim 1, wherein the step of initiating the backup process further includes the following steps:
- detecting a critical state including a failure and/or a redundancy requiring safety- and/or time-critical mode, of the primary application, based on an evaluation of the received application-specific state data, and
- activating the secondary backup application when the critical state is detected.

7. The method of claim 1, wherein the step of initiating the backup process further includes the following steps:
- predicting a critical state including a failure and/or a transient software failure and/or a runtime error and/or a time until a potential crash, of the primary application, based on an application of machine learning using the received application-specific state data and/or based on monitoring compute operations and/or memory transactions; and
- activating the secondary backup application based on the prediction.

8. The method of claim 1, wherein the step of initiating the backup process further includes the following steps:
- predicting a critical state including a hardware failure of the platform, based on an evaluation of the received platform-specific state data; and
- activating the secondary backup application based on the prediction.

9. A non-transitory computer-readable medium on which is stored a computer program including instructions for providing a secondary backup application as a backup for a primary application, for a predictive standby in a distributed system, the instructions, when executed by a computer, causing the computer to perform the following steps using a predictive standby manager:

receiving application-specific state data, the application-specific state data being obtained from monitoring a state of the primary application;

receiving platform-specific state data, the platform-specific state data being obtained from monitoring a state of at least one platform that executes the primary application; and initiating a backup process for using the secondary backup application as the backup for the primary application based on the received application-specific state data and the received platform-specific state data, wherein the predictive standby manager processes both the received application-specific state data and the received platform-specific state data in order to initiate the backup process, and wherein the platform-specific state data includes at least one metric comprising a temperature of the at least one platform, a load of a CPU of the at least one platform, or a utilization of the CPU.

10. A data processing apparatus configured to provide a secondary backup application as a backup for a primary application, for a predictive standby in a distributed system, the data processing apparatus configured to:

receive application-specific state data, the application-specific state data being obtained from monitoring a state of the primary application;

receive platform-specific state data, the platform-specific state data being obtained from monitoring a state of at least one platform that executes the primary application; and initiate a backup process for using the secondary backup application as the backup for the primary application based on the received application-specific state data and the received platform-specific state data, wherein the predictive standby processes both the received application-specific state data and the received platform-specific state data in order to initiate the backup process, and wherein the platform-specific state data includes at least one metric comprising a temperature of the at least one platform, a load of a CPU of the at least one platform, or a utilization of the CPU.

* * * * *